United States Patent [19]

Short, III

[11] Patent Number: 5,067,530
[45] Date of Patent: Nov. 26, 1991

[54] WASTE OIL COLLECTION AND DISPOSAL SYSTEM

[75] Inventor: Edward H. Short, III, Tulsa, Okla.

[73] Assignee: Allied Plastics, Inc., Gastonia, N.C.

[21] Appl. No.: 619,138

[22] Filed: Nov. 28, 1990

[51] Int. Cl.⁵ .............................................. B65B 1/04
[52] U.S. Cl. ..................................... 141/98; 220/571; 220/573; 184/106
[58] Field of Search ..................... 141/330, 334, 98; 220/571, 573, 85 F; 184/106, 1.5

[56] References Cited

U.S. PATENT DOCUMENTS

| | | | |
|---|---|---|---|
| 299,743 | 6/1884 | Connolly | 184/106 |
| 396,619 | 1/1889 | Smith | 220/571 |
| 1,276,079 | 8/1918 | Kovnat | 184/106 |
| 1,334,088 | 3/1920 | Goldstone | 184/106 |
| 1,584,175 | 5/1926 | Irons | 220/571 |
| 3,410,438 | 11/1968 | Bartz | 220/573 |
| 4,022,257 | 5/1977 | O'Connell | 141/98 |
| 4,054,184 | 10/1977 | Marcinko | 184/106 |
| 4,084,655 | 4/1978 | Savron | 180/69.1 |
| 4,099,598 | 7/1978 | Clinard | 184/106 |
| 4,114,660 | 9/1978 | Arruda | 141/98 |
| 4,403,692 | 9/1983 | Pollacco | 206/223 |
| 4,524,866 | 6/1985 | Pollacco | 206/223 |
| 4,702,290 | 10/1987 | Perez | 220/573 |
| 4,802,599 | 2/1989 | Hill | 220/573 |
| 4,880,156 | 11/1989 | Wallet | 184/106 |
| 4,930,602 | 6/1990 | Gust | 220/573 |

FOREIGN PATENT DOCUMENTS 8909362 10/1989 World Int. Prop. O. .......... 184/106

Primary Examiner—Henry J. Recla
Assistant Examiner—Keith Kupferschmid

[57] ABSTRACT

The waste oil collector has a catch pan supported in a cantilever manner by a pair of legs. Apertures are provided in an end wall of the catch pan to which bottles for collecting the drained oil are connected. The bottles extend outwardly at an incline and serve as a counterbalance for supporting the catch pan in the cantilever manner from the legs.

4 Claims, 2 Drawing Sheets

WASTE OIL COLLECTION AND DISPOSAL SYSTEM

Field of the Invention

This invention relates to the protection of the environment and more particularly to the collection and disposal in an environmentally safe manner of waste oil drained from the crankcase of a vehicle.

BACKGROUND OF THE INVENTION

The collection and disposal of waste oil drained from the crankcase of an engine raise many environmental concerns since such waste oil can contaminate the soil and both surface and subterranean water. Regulatory agencies have imposed appropriate regulations upon commercial establishments, such as service stations, garages and the like, to ensure environmentally safe collection and disposal of such waste engine oil. However, it is impossible to regulate effectively the collection and disposal of waste engine oil by individual do-it-yourself maintenance persons.

There are many known practices and products which have been made available for the collection and disposal of waste engine oil to encourage environmentally safe procedures. These known practices and products range from draining an oil pan into an old pan or bucket and then funneling waste oil into a jug that is subsequently delivered to a waste oil disposal facility to waste oil collection pans with associated containers for containing and disposing of the waste oil. With these latter devices, either separate collection pans are provided for subsequent emptying of the waste oil into containers or special types of containers are required to collect and dispose of the waste oil. In either event, these known products are cumbersome to use and have not been a successful solution to the problem.

Therefore, it is an object of this invention to provide a device for collection and proper disposal of waste engine oil which is simple and easy to use and which uses readily available containers for the collection and disposal of the waste engine oil.

It is further an object of this invention to provide a device for collecting waste oil and directing it into used plastic bottles for holding and subsequent disposal.

It is also an object of this invention to provide a device of simple construction and low profile to fit underneath automobiles to allow home mechanics to collect and dispose of waste oil in an environmentally safe manner.

Other objects and advantages of the invention will become apparent upon reading the following description and appended claims, and upon reference to the accompanying drawings.

SUMMARY OF THE INVENTION

The present invention addresses and solves the problems set forth in the preceding discussion by providing a device to collect waste oil and direct it into used plastic bottles for capping and proper disposal at authorized locations like gasoline service stations or other oil recycling facilities.

The waste oil collector has a catch pan that is adapted to be placed under the oil pan of an engine for collecting oil that is drained from the engine. The catch pan has a bottom wall that is slightly inclined so that the oil preferably flows to one end of the pan. The end of the pan to which the oil flows also has at least one aperture. That aperture is threaded or has some other means for attaching a plastic bottle to that aperture. The plastic bottle is typically a used soft drink bottle. Once the oil is drained from the pan into the plastic bottle, the plastic bottle is capped and delivered to an appropriate disposal site. The collector further has legs that help support the catch pan and elevate the catch pan to a sufficient height that the oil will drain into the plastic bottle that is attached to the catch pan. Because a vehicle's oil pan typically has a relatively low clearance from the ground, the plastic bottle slopes at an angle from the catch pan and gives the system a low enough profile to be used under most vehicles.

The disclosed invention facilitates proper disposal of waste oil, and it also provides for proper disposal of used plastic bottles. Even if a gasoline station or recycling center does not have the ability to recycle plastic bottles, at least they will be properly disposed of and not littered. The disclosed waste oil collector, therefore, is a simple yet environmentally effective approach to solving waste oil and plastic bottle disposal problems.

DESCRIPTION OF THE PREFERRED EMBODIMENT

Figure 1:
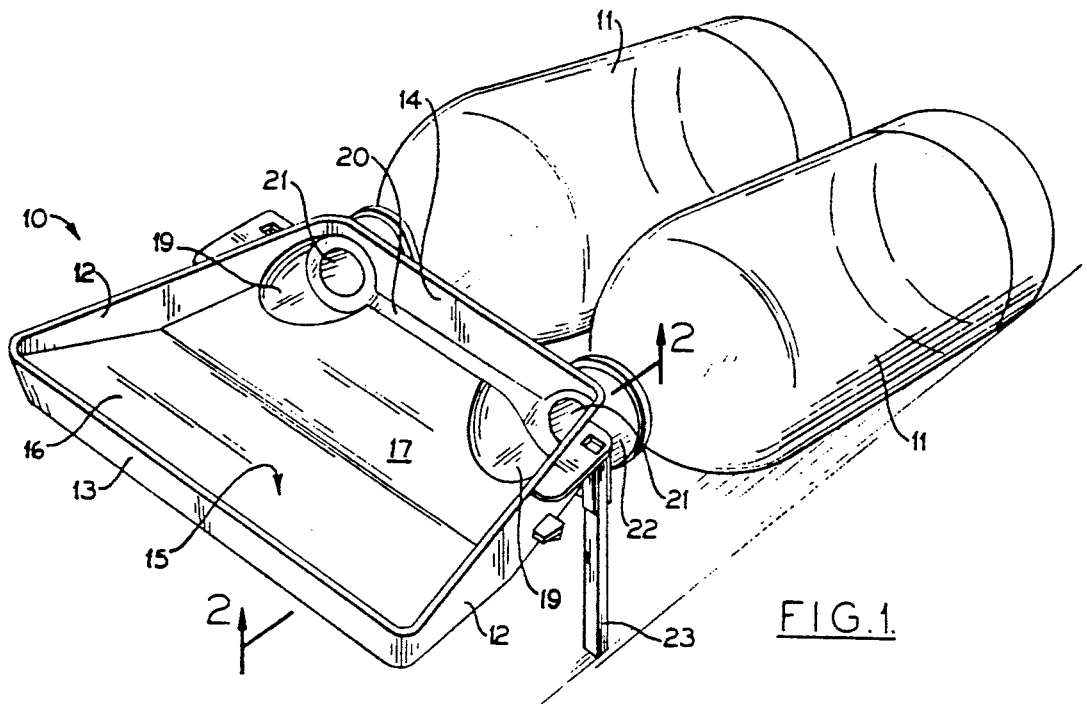
FIG. 1 is a perspective view of the waste oil collector.

Referring to FIG. 1, the waste oil collection and disposal system comprises a catch pan 10 and plastic bottles 11 attached thereto. In the preferred embodiment described herein and illustrated in FIG. 1, the catch pan 10 is made of molded plastic. Other types of material may also be used, including, for instance, cardboard or similar pressed paper materials. Similarly, two plastic bottles 11 are illustrated in the preferred embodiment, however, one or more bottles may be adequate depending on the size of the plastic bottle and depending on the amount of waste oil in a given engine.

Figure 2:
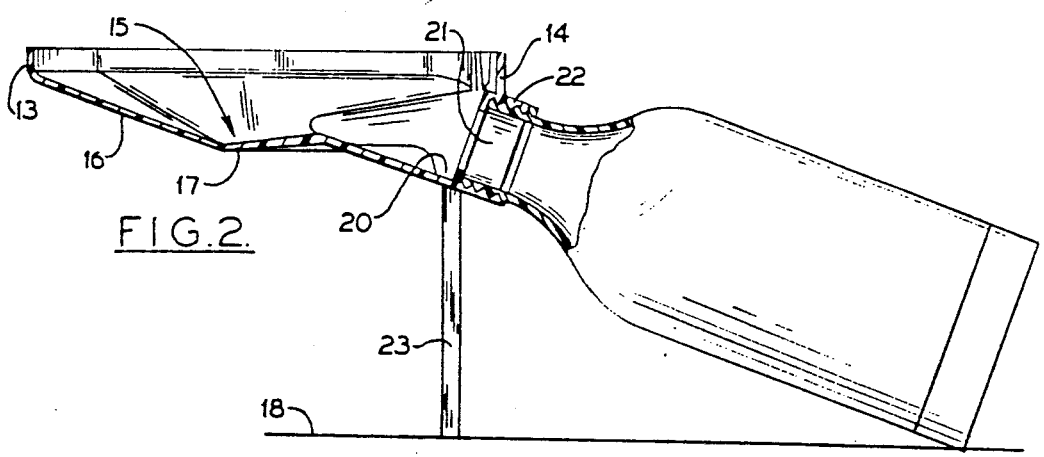
FIG. 2 is a side view including partial cutaway view taken along lines 2—2 of FIG. 1.
Figure 4:
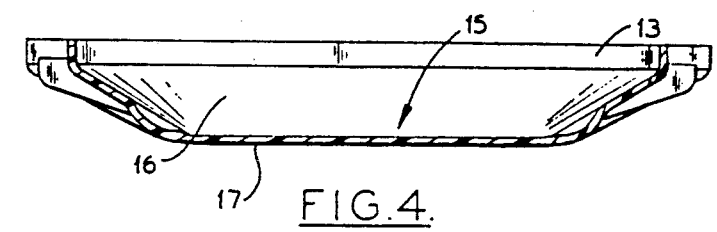
FIG. 4 is a front view of the catch pan taken along lines 4—4 of FIG. 3.
Figure 3:
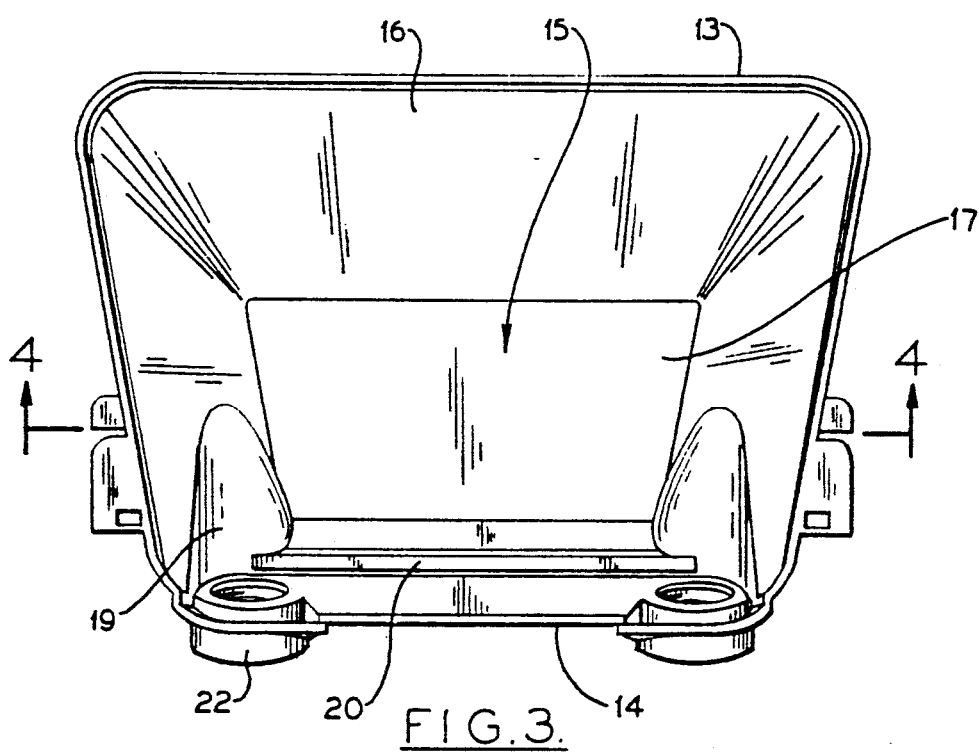
FIG. 3 is a top view of the catch pan.

The catch pan 10 comprises side walls 12 a front wall 13 and an end wall 14 that are generally perpendicular to the bottom 15 of the catch pan. The bottom 15 of the preferred embodiment comprises a front side 16 and end side 17. Referring to FIG. 2, the front side 16 of the bottom is inclined at an acute angle to the horizontal ground level 18. The end side 17 of the bottom 15 comprises a generally flat panel that is substantially parallel with the horizontal 18. While the slope described herein is preferable, the bottom may be parallel with the horizontal or even sloping slightly in the opposite direction. Any oil remaining in the catch pan is emptied into the bottles 11 as they are stood in an upright position preparatory to disengagement and disposal as described herein.

The end side 17 of the bottom 15 further comprises scalloped portions 19 that further incline the bottom 15 to its lowest point immediately adjacent the end wall 14. The scalloped portions 19 are immediately adjacent both the end wall 14 and the side Walls 12. The bottom 15 further comprises a valley 20 that is adjacent the end wall 14 and extends from one of the scalloped portions 19 to the other. The bottom of the valley is the same depth as the lowest point of the scalloped portions.

The end wall 14 further defines two apertures 21 that are adjacent the scalloped portions 19. Adjacent the end wall 14 and integrally associated therewith, there are engagement means 22 further defining the circular aperture 21 and further comprising thread means for engaging the threads of plastic bottles 11. Thus, the aperture 21 is defined by the end wall 14 and the engagement means 22. Although not illustrated in the drawings, the engagement means may also incorporate an air passage that allows air to escape efficiently from the plastic bottle that is being filled with waste oil.

The engagement means 22 are preferred to be threaded for receiving the mouth of standard soft drink bottles. However, any releasable engagement means are envisioned, including, for instance, snap means or rubber collar means. As best seen in FIG. 2, the angle of incline of the scalloped portion 19 is continued through the aperture 21. The engagement means 22, therefore, are threaded so that a plastic bottle 11 extends down from the catch pan 10 at an angle from the horizontal base portion 17 of the bottom 15. The angle is preferably relatively slight so that the plastic bottles 11 do not require a large clearance to place the entire system under a vehicle's oil pan.

The catch pan 10 further comprises legs 23 that are attached to the catch pan at the side wall 12 for cantilever supporting the catch pan so that the oil can drain into the plastic bottles 11. The legs have a length greater than the diameter of the plastic bottle to support the catch pan at a sufficient elevation that, when the system is assembled, the end side 17 of the bottom 15 is horizontal. Once assembled, the entire system is supported by the legs 23 and the plastic bottles 11, which bottles serve as a counter balance for supporting the catch pan 10. Alternatively, the support legs are a wire band extending from a side of the catch pan, across the width of the pan and up to the other side of the catch pan. When not in use, the wire support may be rotated up so the entire catch pan is only as thick as the height of the walls of the catch pan, thus allowing easy storage of the catch pan.

In operation, the catch pan is placed under the oil pan of an engine that is to be drained of its waste oil. The oil pan screw is then removed so that waste oil will empty into the catch pan 10. The incline of the bottom 15 of the catch pan causes the oil to move to the end side of the catch pan. Further, the scalloped portions 19 draw the oil into the bottom of the catch pan next to the apertures 21. Subsequently, the oil is guided through the apertures 21 and into the plastic bottles 11. In the event that the surface underneath an automobile or other engine is uneven, then a certain amount of oil may collect and remain in the catch pan 10. That oil may be drained into the bottles by merely tilting the entire system towards the plastic bottles.

Once the waste oil has been drained into the plastic bottle, the plastic bottle is then recapped and carried to a gasoline service station or recycling center where the oil may be recycled for further uses. Similarly, the used plastic bottles may then be disposed of properly by the gasoline station or the recycling center.

While a particular embodiment of the invention has been shown, it will be understood, of course, that the invention is not limited thereto since modifications may be made by those skilled in the art, particularly in light of the foregoing teachings. It is, therefore, contemplated by the appended claims to cover any such modifications as incorporate those features which constitute the essential features of these improvements within the true spirit and the scope of the invention.

That which is claimed is:

1. A waste oil collector adapted to be placed under the oil pan of a vehicle to catch used oil drained form the engine characterized in that the waste oil is directed into at least one bottle for collection and disposal, said collector comprising a catch pan that is generally rectangular in shape adapted to be placed under the oil pan of an engine for collecting oil that is drained form the engine, said catch pan comprising end, side and bottom walls defining an initial oil collection chamber therein, said bottom wall being inclined to the horizontal so that the oil flows to one end of the pan, said end wall at said one end of said pan having at least one aperture, at least one bottle for receiving and collecting waste oil for disposal extending outwardly at an incline to the horizontal from said aperture, releasable engagement means operatively associated with the aperture in the end wall for connecting the outwardly extending bottle to said end wall to receive waste oil exiting through said aperture, and leg means extending downwardly from said catch pan adjacent said end wall for supporting said catch pan in a cantilever manner and at a sufficient elevation that the oil can drain into the inclined bottle, said bottle in the inclined position thereof serving as a counterbalance for supporting said catch pan in said cantilever manner from said leg means.

2. A waste oil collector according to claim 1 wherein said bottle is a used soft drink bottle.

3. A waste oil collector according to claim 2 wherein said soft drink bottle has threads on its upper end, and wherein said releasable engagement means are threads for receiving the threads of the soft drink bottle.

4. A waste oil collector according to claim 1 wherein said end wall at said one end of said catch pan has two spaced apart apertures, and a bottle for receiving and collecting waste oil extends outwardly at an incline from each aperture.

* * * * *

UNITED STATES PATENT AND TRADEMARK OFFICE
CERTIFICATE OF CORRECTION

PATENT NO.   :   5,067,530

DATED        :   November 26, 1991

INVENTOR(S)  :   Short, III

It is certified that error appears in the above-identified patent and that said Letters Patent is hereby corrected as shown below:

Column 2, line 66, please delete "Walls" and substitute
   --walls-- therefor.

Column 4, line 20, please delete "form" and substitute
   --from-- therefor.

Column 4, line 25, please delete "form" and substitute
   --from-- therefor.

Signed and Sealed this

Thirtieth Day of March, 1993

*Attest:*

STEPHEN G. KUNIN

*Attesting Officer*    Acting Commissioner of Patents and Trademarks